United States Patent [19]

Tanaka et al.

[11] Patent Number: 5,376,972
[45] Date of Patent: Dec. 27, 1994

[54] VIDEO SIGNAL TRANSMISSION/RECEPTION USING HIGH PASS FILTERS FOR MOTION DETECTION

[75] Inventors: Yutaka Tanaka; Osamu Matsunaga, both of Tokyo, Japan

[73] Assignee: Sony Corporation, Tokyo, Japan

[21] Appl. No.: 856,898

[22] PCT Filed: Sep. 18, 1990

[86] PCT No.: PCT/JP90/01193

§ 371 Date: May 14, 1992

§ 102(e) Date: May 14, 1992

[87] PCT Pub. No.: WO92/05666

PCT Pub. Date: Apr. 2, 1992

[51] Int. Cl.⁵ .................... H04N 7/13; H04N 5/14
[52] U.S. Cl. ...................... 348/700; 348/665
[58] Field of Search .............. 358/105, 11, 12, 31, 358/13; 348/700, 702, 665, 453, 456, 441, 391, 393, 396; H04N 5/14, 7/13

[56] References Cited

U.S. PATENT DOCUMENTS

| | | | |
|---|---|---|---|
| 3,845,498 | 10/1974 | Justice | 358/11 |
| 4,476,484 | 10/1984 | Haskell | 358/11 |
| 4,613,893 | 9/1986 | Weitzel | 358/11 |
| 4,641,180 | 2/1987 | Richter | 358/31 |
| 4,654,696 | 3/1987 | Dayton | 358/11 |
| 4,701,783 | 10/1987 | Glenn | 358/12 |
| 4,794,456 | 12/1988 | Tsinberg | 358/11 |
| 4,868,650 | 9/1989 | Weckenbrock | 358/105 |
| 4,885,631 | 12/1989 | Fukinuki | 358/105 |
| 4,982,271 | 1/1991 | Sugiyama | 358/31 |
| 4,994,900 | 2/1991 | Ebara | 358/31 |
| 5,001,551 | 3/1991 | Otto | 358/12 |
| 5,140,410 | 8/1992 | Shin | 358/31 |

FOREIGN PATENT DOCUMENTS

| | | | |
|---|---|---|---|
| 0082489 | 6/1983 | European Pat. Off. . | |
| 0348207 | 12/1989 | European Pat. Off. | H04N 5/14 |
| 0130685 | 8/1983 | Japan | 358/105 |
| 58-205377 | 11/1983 | Japan . | |
| 0186487 | 10/1984 | Japan | 358/105 |
| 60-203013 | 10/1985 | Japan | H03H 15/02 |
| 62-143581 | 6/1987 | Japan . | |
| 62-224175 | 10/1987 | Japan . | |
| 62-274993 | 11/1987 | Japan . | |
| 63-14587 | 1/1988 | Japan . | |
| 0092093 | 4/1991 | Japan | 358/105 |
| 4180380 | 6/1992 | Japan | 358/105 |

Primary Examiner—Tommy P. Chin
Assistant Examiner—Bryan S. Tung
Attorney, Agent, or Firm—William S. Frommer; Alvin Sinderbrand

[57] ABSTRACT

In a video signal transmission/reception system based on interlace scanning, video signals picked up by the sequential scanning are limited in vertical frequency band by filters (3a), (3b) and (3c) and transmitted as an interlace scanning video signal. Then, a signal of a predetermined vertical frequency band is extracted from the signal thus transmitted and a motion detection is carried out on the basis of the thus extracted signal.

8 Claims, 6 Drawing Sheets

VIDEO SIGNAL TRANSMISSION/RECEPTION USING HIGH PASS FILTERS FOR MOTION DETECTION

DESCRIPTION

1. Technical Field

The present invention relates to a video signal transmission/reception system based on interlace scanning and, more particularly to a system in which a motion detection necessary for processing a received signal is carried out on the reception side.

2. Background Art

In recent television receivers, when a received video signal is processed, a motion detection for detecting whether a picture is a still image or real moving image is carried out and then a proper signal processing is carried out on the basis of a resultant motion detected information. When a composite video signal, for example, is separated into a luminance signal and color difference signals, the separation processing is carried out at respective frequency bands by utilizing only the video signals within the same frame if a picture is a real moving image. If a picture is a still image, then video signals of adjacent frames are utilized and the separating processing is carried out by a comb filter, thereby optimum processing being carried out in response to the signal conditions.

However, a conventional motion detecting circuit is low in motion detection accuracy of picture. When a motion detection is carried out on the basis of a vertical correlation of pictures between adjacent fields, for example, there is then the disadvantage such that even the still image is erroneously detected as the real moving image at the portion in which no vertical correlation is present. For this reason, according to the prior art, a responsiveness is lowered by widening a motion detection range or a motion is identified by using also motion detection information provided by other methods. If the responsiveness is lowered as described above, then there is then the disadvantage such that a resolution of a processed video signal is lowered. Further, if a plurality of motion detection information is obtained, there is then the problem such that the arrangement of the motion detecting circuit becomes complex.

SUMMARY OF THE INVENTION

In view of the aforesaid aspects, the present invention is to provide a video signal transmission/reception system of a simplified configuration in which a motion detection can be carried out on the reception side reliably.

In order to solve the aforesaid problems, according to the video signal transmission/reception system of the present invention, video signals picked up by an image pickup unit according to the sequential scanning are limited in vertical frequency band by low-pass filters, the video signals thus limited are converted into an interlace scanning video signal by a converting circuit, a signal of a predetermined vertical frequency band is extracted from the received video signal by a high-pass filter on the reception side of the video signal thus transmitted and a motion of the video signal is detected on the basis of the thus extracted signal.

Thus, a motion detection of high accuracy can be carried out by the simple arrangement in which the video signal of the predetermined vertical frequency band is only identified on the reception side

DETAILED DESCRIPTION OF THE PREFERRED EMBODIMENT

An embodiment of the video signal transmission/reception system according to the present invention will hereinafter be described with reference to the accompanying drawings.

Figure 1:
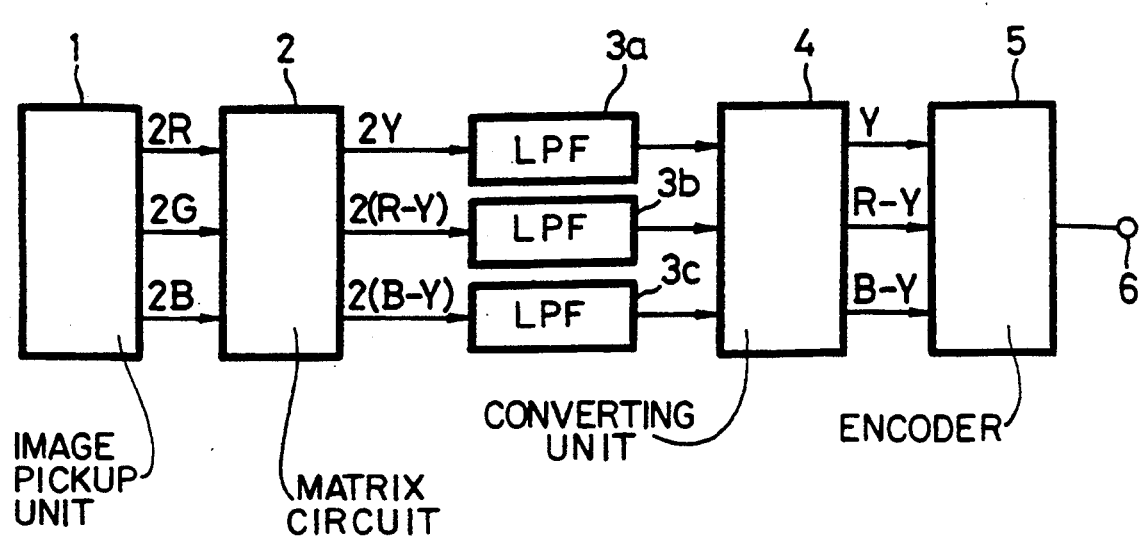
FIG. 1. is a block diagram showing a transmission side according to an embodiment of the present invention.

An arrangement of a transmission side is illustrated in FIG. 1. In the figure, reference numeral 1 depicts an image pick-up unit formed of a video camera. The image pick-up unit 1 of this embodiment picks up an image according to the line sequential scanning manner at every field to output as image signals three primary color signals 2R, 2G and 2B of a so-called double scanning based on the line sequential scanning of horizontal scanning lines (525 lines per field) twice the ordinary scanning lines per field. These image signals 2R, 2G and 2B are supplied to a matrix circuit 2 and converted into a luminance signal 2Y and color difference signals 2(R-Y) and 2(B-Y) for double speed scanning by the matrix circuit 2. The luminance signal 2Y and the color difference signals 2(R-Y) and 2(B-Y) thus converted are respectively supplied to low-pass filters 3a, 3b and 3c. Each of the low-pass filters 3a, 3b and 3c is adapted to pass a band of a video signal having a frequency less than a predetermined frequency, which will be described later. Output signals of these low-pass filters 3a, 3b, 3c are supplied to a scan converting circuit 4, and horizontal scanning lines of one field are converted to a half, i.e., 262.5 to thereby provide a luminance signal Y and color difference signals R-Y and B-Y conforming to the ordinary broadcast standards for interlace scanning. Then, the luminance signal Y and the color difference signals R-Y and B-Y output from the scan converting circuit 4 are supplied to an encoder 5, in which they are converted into a composite video signal according to the NTSC broadcast standards, which then is fed to an output terminal 6.

Then, the composite video signal developed at the output terminal 6 is processed by some suitable method such as a carrier modulation or the like and then transmitted by means of a wireless or wire system.

Figure 2:
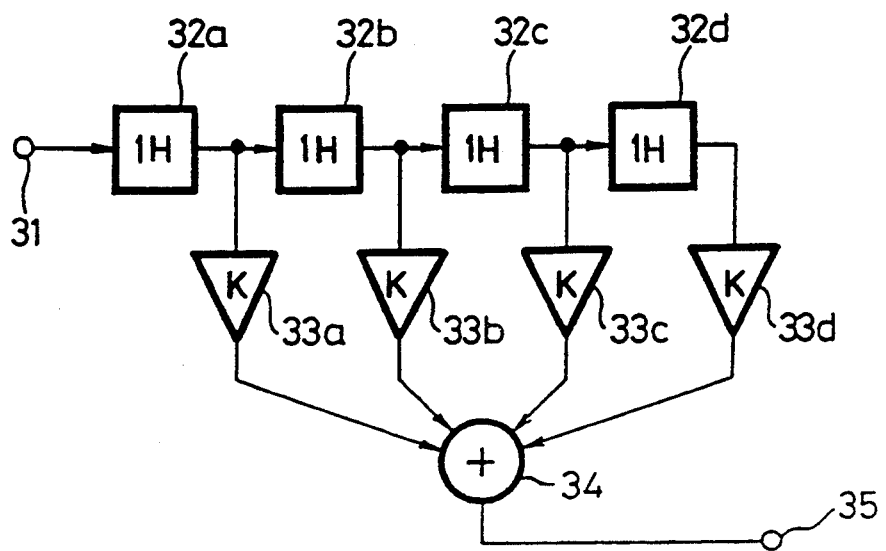
FIG. 2 is a block diagram of a filter utilized on the transmission side according to the embodiment of the present invention.

The above-mentioned low-pass filters 3a, 3b and 3c will be described herein. In this embodiment, these filters are each formed of a transversal filter. This transversal filter is disclosed in Japanese Laid-Open Patent Publication No. 60-203013, for example, and constructed as shown in FIG. 2 in this embodiment. More specifically, a signal applied to an input terminal 31 is supplied to a series circuit of memories 32a, 32b, 32c, 32d, each of which is provided as delay means for delaying the above signal by one horizontal scanning period (one horizontal scanning period of a double speed scanning signal). Output signals of the respective memories 32a, 32b, 32c and 32d are respectively supplied through coefficient multipliers 33a, 33b, 33c, 33d to an input terminal of an adder 34 and an added output of the adder 34 is supplied to an output terminal 35.

Figure 5:
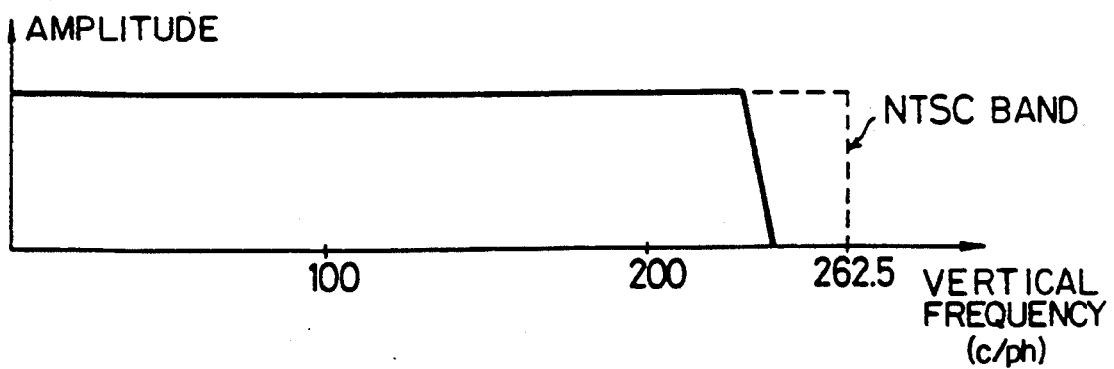
FIGS. 5, 6, 7 and 8 are respectively frequency characteristic diagrams used to explain the embodiment of the present invention.

The luminance signal 2Y and the color difference signals 2(R-Y) and 2(B-Y) are limited in band by utilizing the transversal filters thus arranged. In the luminance signal 2Y, a signal having a vertical frequency near 262.5 c/ph (cycle/picture height) is cut and only a signal in the frequency band below this band as shown in FIG. 5 by a solid line is allowed to pass. In this case, the signal of 262.5 c/ph is a signal of an upper limit (broken line) that can be transmitted during the horizontal scanning period according to the NTSC system.

Figure 6:
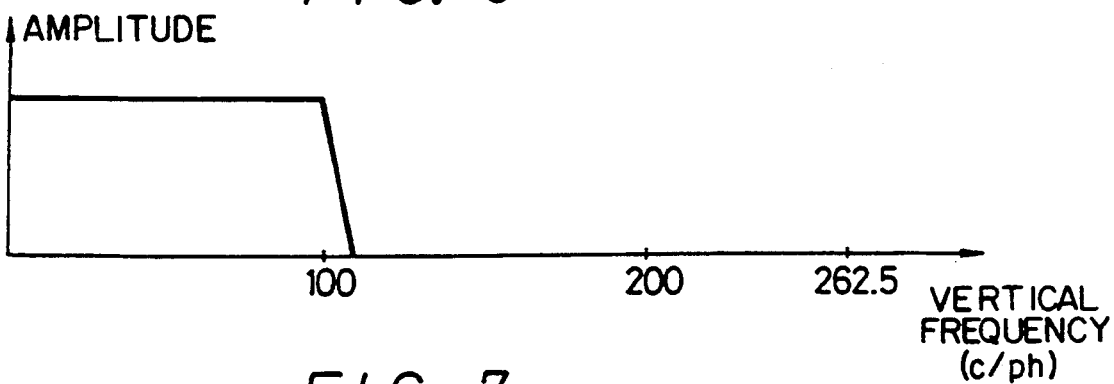
Figure 7:
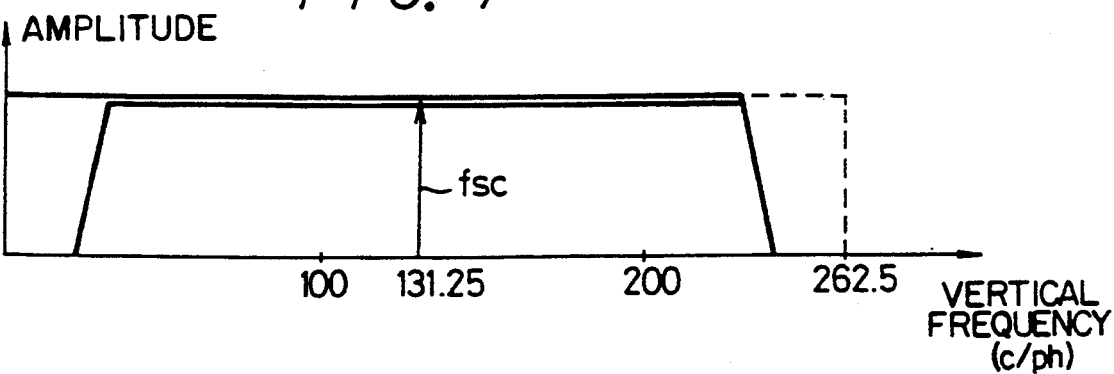

Further, the color difference signals 2(R-Y) and 2(B-Y) are similarly limited in band and only the color difference signals in the frequency band lower than that of the luminance signal and which are below about 100 c/ph as shown in FIG. 6 are allowed to pass. Then, from the respective signals band-limited by the low-pass filters 3a, 3b and 3c, a composite video signal in which the band near the vertical frequency of 262.5 c/ph is limited is obtained by the encoder 5 as shown in FIG. 7. In this case, the color subcarrier frequency fsc is 131.25 c/ph.

Figure 3:
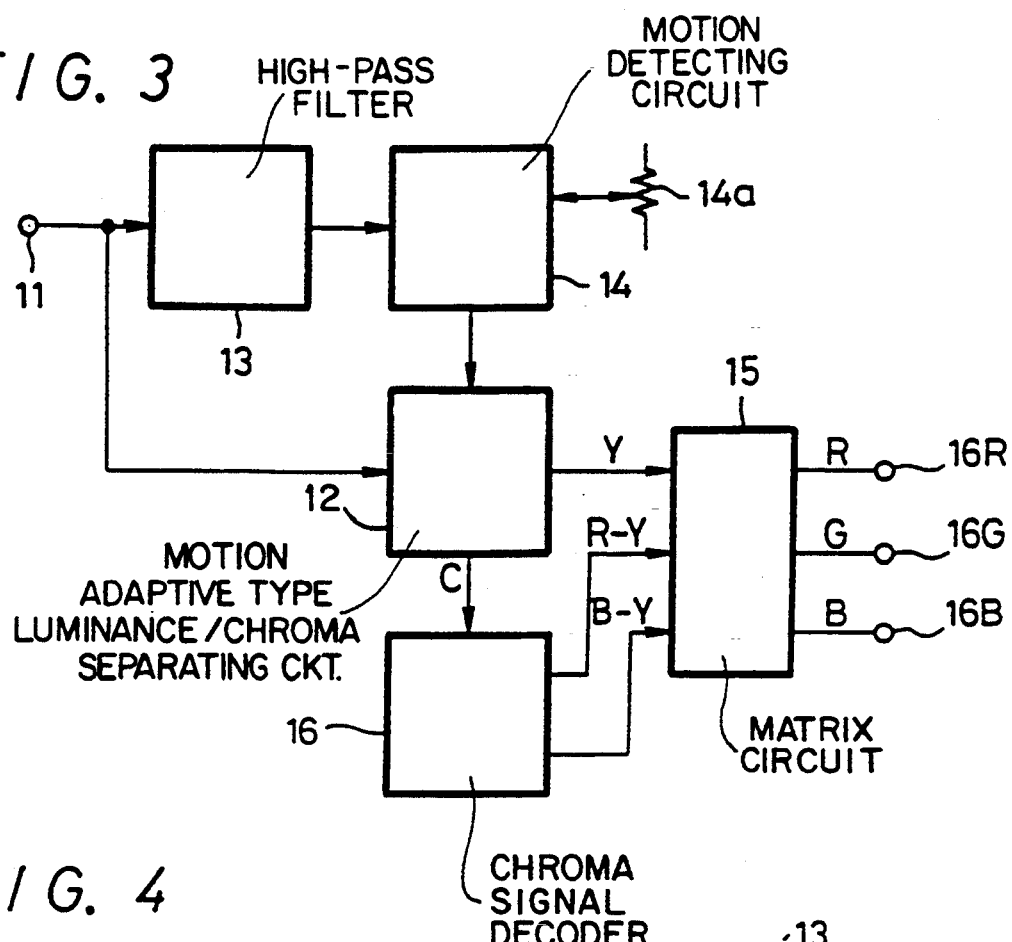
FIG. 3 is a block diagram showing a reception side according to the embodiment of the present invention.
Figure 4:
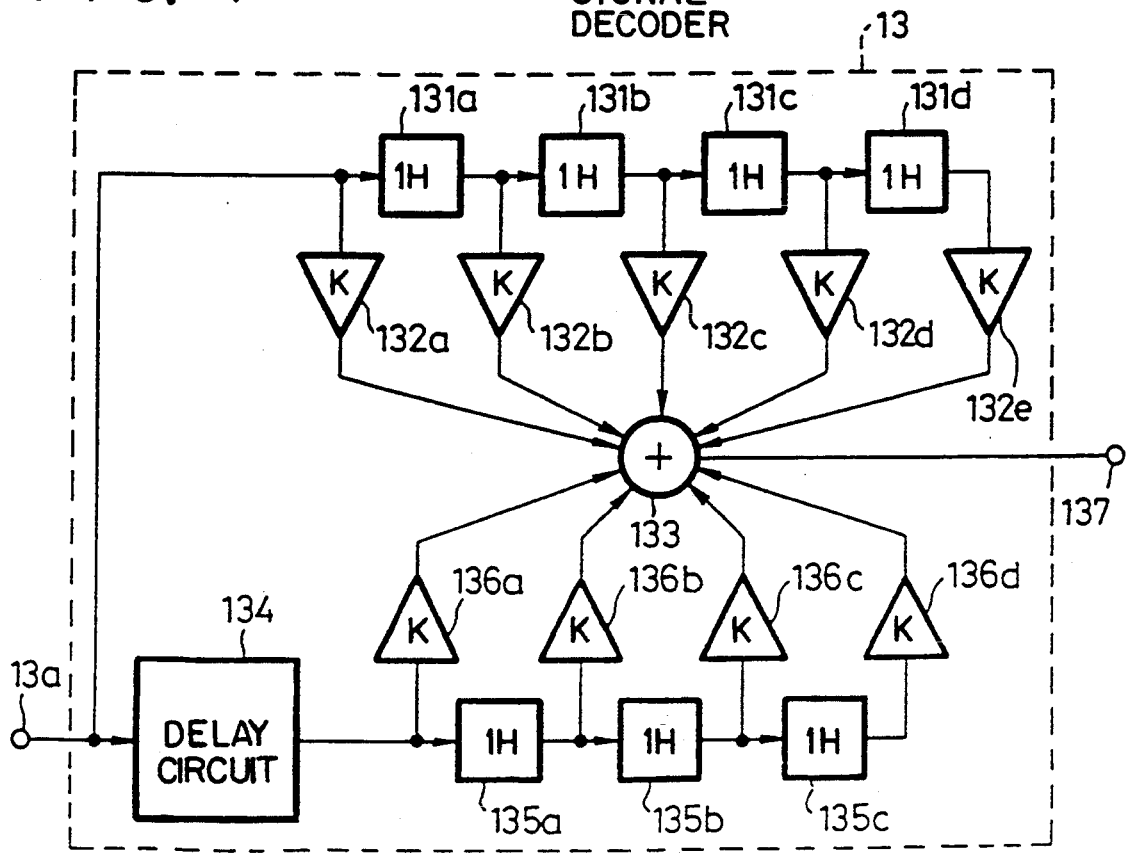
FIG. 4 is a block diagram of a filter utilized on the reception side according to the embodiment of the present invention.

The circuitry of the reception side for receiving the video signal transmitted by the above-mentioned arrangement is illustrated in FIG. 3. In the figure, reference numeral 11 depicts a video signal input terminal and this input terminal 11 is supplied with a composite video signal which results from demodulating the carrier of the received video signal from the transmission side. This composite video signal is supplied to a motion adaptive type luminance/chroma separating circuit 12. The separating circuit 12 is adapted to separate the composite video signal to provide a luminance signal and a chroma signal and also is adapted to carry out a proper separation processing on the basis of a motion detection information of a picture. More specifically, the video signal applied to an input terminal 11 is supplied to a motion detection high-pass filter 13. The high-pass filter 13 is formed by using a transversal filter and is arranged as shown in FIG. 4. That is, the composite video signal applied to an input terminal 13a of the high-pass filter 13 is supplied to a series circuit of memories 131a, 131b, 131c and 131d, each of which is provided as delay means for delay a signal by one horizontal scanning period. The input signal to the memory 131a and output signals from the respective memories 131a, 131b, 131c and 131d are respectively supplied through coefficient multipliers 132a, 132b, 132c, 132d and 132e to an input terminal of an adder 133.

Further, the composite video signal applied to the input terminal 13a is supplied through a delay circuit 134, which delays a signal by one field period, to a series circuit of memories 135a, 135b and 135c, each of which delays a signal by one scanning period. Then, the output signal of the delay circuit 134 and the output signals from the respective memories 135a, 135b and 135c are respectively supplied through coefficient multipliers 136a, 136b, 136c and 136d to the input terminal of an adder 133. In this case, only a desired high band signal is extracted by selecting coefficients of the respective coefficient multipliers 132a to 132e and 136a to 136d.

Then, the output signal of the adder 133 is supplied to an output terminal 137 as the output signal of the high-pass filter 13.

Figure 8:
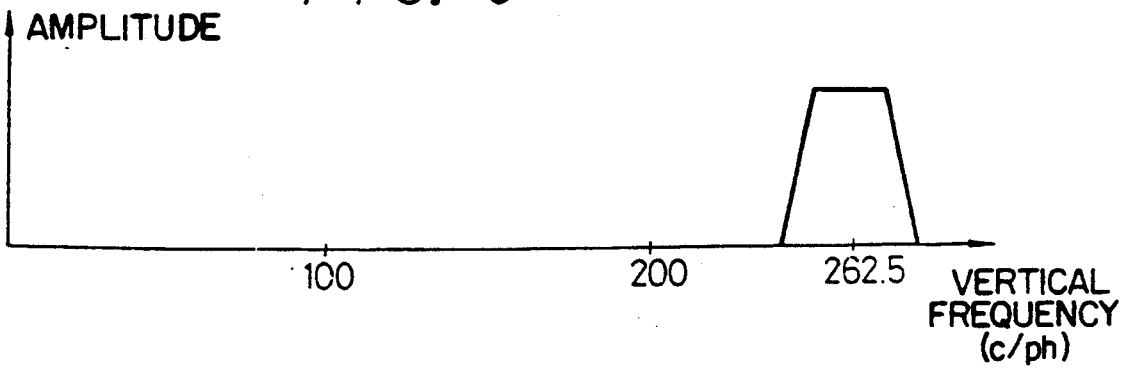

In this embodiment, the output signal of the high-pass filter 13 thus arranged is utilized as a motion detection signal of a picture. In this case, a signal of a frequency band extracted from the composite video signal by this high-pass filter 13 is selected to be a signal having a frequency near the vertical frequency of 262.5 c/ph as shown in FIG. 8.

The output signal from the high-pass filter 13 is supplied to a motion detecting circuit 14. When detecting a signal of an amplitude exceeding a range previously set by an adjustment volume 14a from the output signal of the filter 13, the motion detecting circuit 14 determines that a picture has a motion, while when the amplitude of the output signal from the filter 13 falls in the thus set range, the motion detecting circuit determines that a picture has no motion. Therefore, the motion detecting circuit supplies control signals corresponding to the respective judged states to the motion adaptive type luminance/chroma separating circuit 12.

When instructed by the control signal such that the picture has no motion, the motion adaptive type luminance/chroma separating circuit 12 carries out the separation processing from video signals of several adjacent fields on the basis of a comb filter, while when instructed by the control signal such that the picture has a motion, the motion adaptive type luminance/chroma separating circuit carries out the separation processing only from the video signal within one field on the basis of a bandpass filter.

The luminance signal Y thus separated is supplied to a matrix circuit 15 and the chroma signal C thus separated is supplied to a chroma signal decoder 16. Also, the color difference signals R-Y and B-Y are formed from the chroma signal C by the chroma signal decoder 16 and these color difference signals R-Y and B-Y are supplied to the matrix circuit 15. Primary color signals R, G and B are obtained from the luminance signal Y and the color difference signals R-Y and B-Y by the matrix circuit 15 and then the respective primary color signals R, G, and B are fed to a picture receiving circuit (not shown) of at the later stage through terminals 16R, 16G and 16B.

Figure 9A:
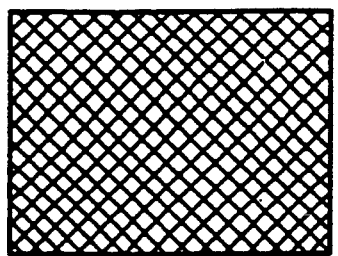
FIGS. 9A–9E, 10A–10E, and 11A–11E are respectively diagrams used to explain the embodiment of the present invention.
Figure 9B:
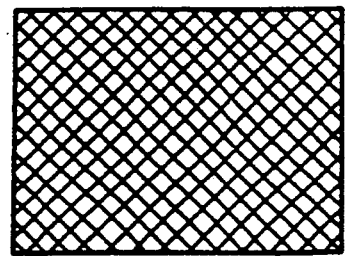
Figure 9C:
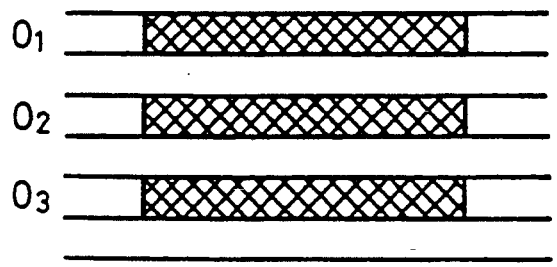
Figure 9D:
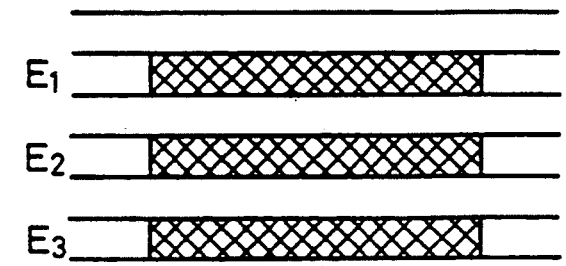
Figure 9E:
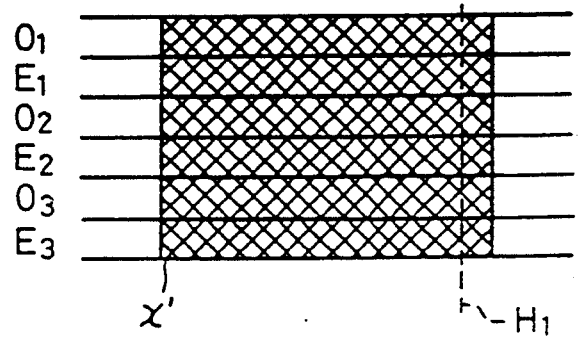

Operation for receiving the video signal by the above-mentioned arrangement will be described next. Let it be assumed that, when a video signal transmitted from the transmission side thus arranged as shown in FIG. 1 is received, this received video signal, for example, is a still picture. More specifically, let it be assumed that, as shown in FIG. 9A, a rectangular object x is displayed by a picture picked up during a certain odd field and that the object x is displayed at the same position of a picture picked up during the next even field (FIG. 9B) of this odd field. At that time, since the video signal of each field received on the reception side is converted into the interlace scanning video signal, the object x displayed by the video signal of odd field is displayed by lines $O_1, O_2, O_3 \ldots$ which are extracted from the video signal by one line each as shown in FIG. 9C, while the object x displayed by the video signal of even field is displayed by lines $E_1, E_2, E_3 \ldots$ between the lines $O_1, O_2, O_3$ as shown in FIG. 9D. Then, as shown in FIG. 9E, an image of one frame is formed from video signals of respective lines of both fields and an object x' is displayed in a received image as shown in FIG. 9E. Examining how the received image in which the object x' is displayed is changed in the vertical direction, it is to be noted that a signal is not suddenly changed at every line in a vertical direction $H_1$ near the contour portion of the object x' while the signal state displaying the object x' is continued several lines.

Accordingly, when the output signal is extracted by the high-pass filter 13, the amplitude of the output signal does not exceed the range previously set by adjustment volume 14a because the signal has not changed at any of the lines in the vertical direction $H_1$. Thus, the motion detecting circuit 14 determines that the picture has no motion.

On the basis of the above-mentioned judgement, the motion detecting circuit 14 supplies a corresponding control signal to the motion adaptive type luminance/chroma separating circuit 12 which then carries out the separation processing by utilizing the comb filter suitable for the still image.

Figure 10A:
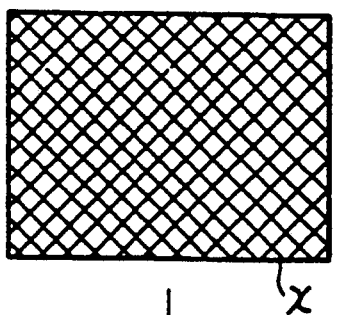
Figure 10B:
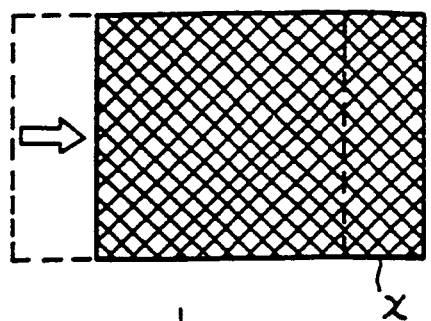
Figure 10C:
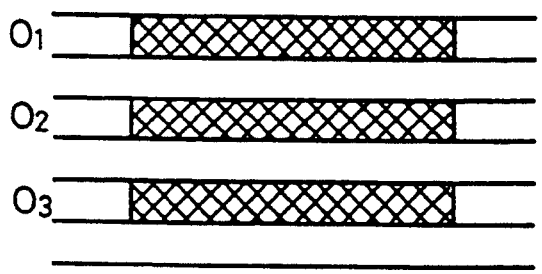
Figure 10D:
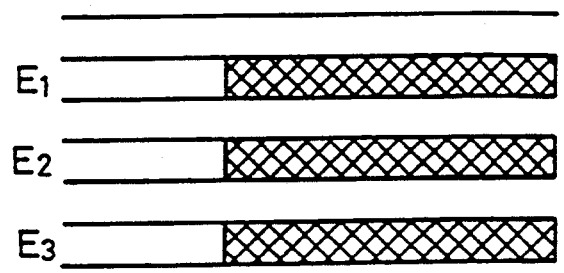
Figure 10E:
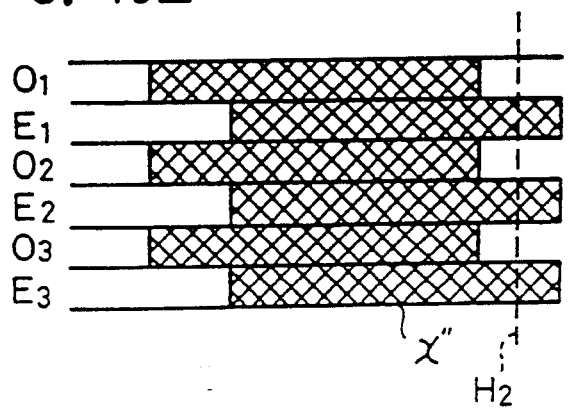

Operation in which the received video signal represents a real moving picture will be described next. Let it be assumed that, as shown in FIG. 10A, a rectangular object x is displayed by a picture picked up during a certain odd field and that an object x, which is somewhat moved in the horizontal direction, is displayed on a picture picked up during the next even field of the above odd field (FIG. 10B). At that time, since the video signal of each field received on the reception side is converted into the interlace scanning video signal, the objects x displayed during the odd field and the even field are displayed by lines $O_1$, $O_2$, $O_3$ ... and $E_1$, $E_2$, $E_3$ ... which are selectively extracted from the image signals at one line each as shown in FIGS. 10C and 10D. Then, as shown in FIG. 10E, an image of one frame is formed from the video signals of respective lines of both fields and an object x" in the received image is displayed. At that time, since the video signals of both fields constructing one frame result from picking up objects x located at different positions, the positions of the object x" displayed by the odd lines $O_1$, $O_2$, $O_3$ ... and the even lines $E_1$, $E_2$, $E_3$ ... are different, thereby the rapid change of signal at every line being presented in a vertical direction $H_2$ near the contour portion of the object x". That is, when the output signal is extracted by the high-pass filter 13, the amplitude of the output signal exceeds the range previously set by the adjustment volume 14a because of the change in the signal at several of the lines in the vertical direction $H_2$. Thus, the motion detecting circuit 14 determines that the picture has a motion.

On the basis of the above-mentioned judgement, the motion detecting circuit 14 supplies a corresponding control signal to the motion adaptive type luminance/chroma separating circuit 12 which then carries out the separating processing by utilizing the bandpass filter suitable for the real moving picture.

Figure 11A:
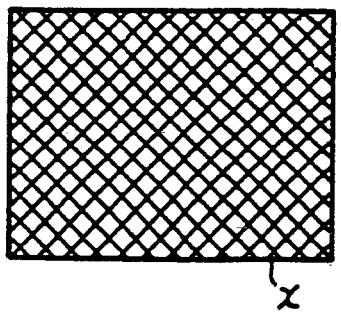
Figure 11B:
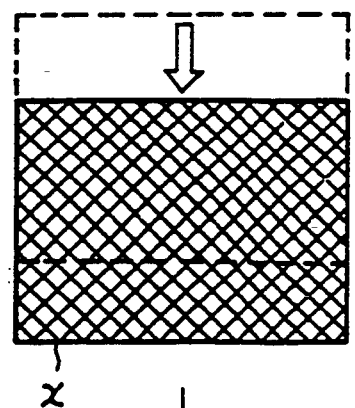
Figure 11C:
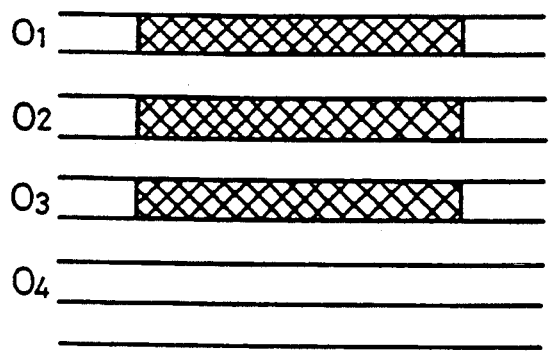
Figure 11D:
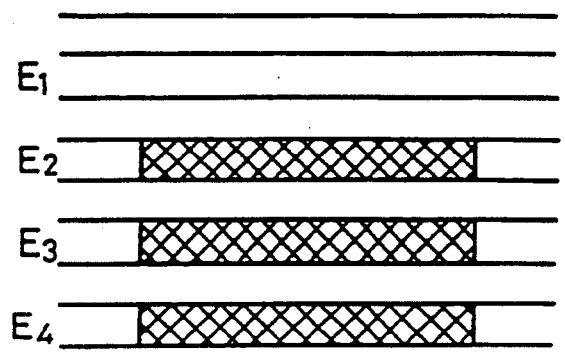
Figure 11E:
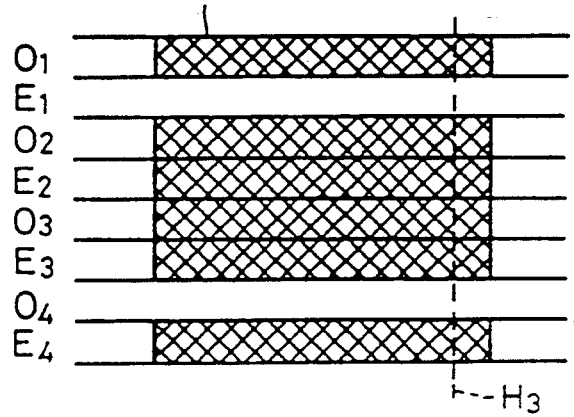

Further, the motion detection is similarly carried out in the case of an object which moves in the vertical direction. That is, let it be assumed that, as shown in FIG. 11A, for example, a rectangular object x is displayed by a picture picked up during a certain odd field and that an object x, which is somewhat moved in the vertical direction, is displayed in a picture picked up during the next even field (FIG. 11B) of the above odd field. At that time, since the video signal of each field received on the reception side is converted into the interlace scanning video signal, the objects x displayed on the odd field and the even field are displayed on the lines $O_1$, $O_2$, $O_3$ ... and $E_1$, $E_2$, $E_3$ ... which are selectively extracted one line each from the image signal as shown in FIGS. 11C and 11D. Then, as shown in FIG. 11E, an image of one frame is formed from the video signals of respective lines of both fields and an object x''' in the received image is displayed. At that time, since the video signals of both fields constituting one frame result from picking up objects x at different positions, the object is displayed at every line by only odd line or even line at the position in which the positions of the objects x are not overlapped. As a result, when the displayed portion of the object x''' is seen from a vertical direction $H_3$, then the rapid change of signal at every line occurs. Accordingly, when the output signal is extracted by the high-pass filter 13, the amplitude of the output signal exceeds the range previously set by the adjustment volume 14a because of the change in the signal at several of the lines in the vertical direction $H_3$. Thus, the motion detecting circuit 14 determines that the picture has no motion and hence the motion adaptive type luminance/chroma separating circuit 12 carries out the separation processing suitable for a real moving image.

As described above, according to the video signal transmission/reception system of this embodiment, the vertical frequency is limited on the transmission side and the high band component is extracted from the video signal on the reception side, for thereby carrying out the motion detection of the picture. Therefore, the motion detection of high accuracy can be carried out by the simple arrangement. In this case, since the chroma signal (color difference signals) is limited to the frequency band lower than that of the luminance signal on the transmission side according to this embodiment, the motion detection of high accuracy can be carried out on the basis of only the luminance component which is free from the influence of the chroma signal. Further, since the motion detection information of high accuracy is obtained as described above, the luminance signal and the chroma signal can always be separated in the optimum condition suitable for the states of picture, which can improve the quality of the received image.

Incidentally, while the motion detection information is utilized for the separation processing of the luminance signal and the chroma signal as described above, it is needless to say that the motion detection information can be utilized in a wide variety of signal processings such as scan speed conversion or the like in order to improve the quality of the received image. While the present embodiment is applied to the NTSC system as described above, it can be easily understood that the present embodiment is not limited thereto and that it may be applied to other broadcasting systems. Furthermore, of course, the present invention is not limited to the above-mentioned embodiment, and various modifications may be effected therein without departing from the gist of this embodiment.

As set out above, according to the present invention, the motion detection of high accuracy based on the luminance component, which is free from the chroma signal, can be effected by the simple arrangement, and a satisfactory signal processing based on the motion detection information of high accuracy can be carried out.

We claim:

1. A video signal transmission/reception method comprising the steps of:
   picking up an image by sequential scanning and producing a derived image signal, limiting said derived image signal to a vertical frequency band defined by a predetermined transmission format by a low-pass filter, scan converting the limited vertical frequency signal to an interlace scanning video signal having luminance and chrominance components, transmitting said interlace scanning video signal, receiving the transmitted video signal, extracting a signal of predetermined frequency band from the received video signal by a high-pass filters, motion detecting the received video signal as a function of an amplitude of the extracted signal of predetermined frequency band, selecting one of comb filtering the received video signal and band pass filtering the received video signal as a function of the detection of motion, and signal as a separating the received video signal into respective luminance and chrominance components using said comb filtering when no motion is detected.

2. The method of claim 1, further comprising the steps of:

decoding said chrominance components into color difference signals, and converting said luminance components and said color difference signals into primary color signals.

3. A video signal transmission/reception method comprising the steps of:

picking up an image by sequential scanning and producing a derived image signal, limiting said derived image signal to a vertical frequency band defined by a predetermined transmission format by a low-pass filter, scan converting the limited vertical frequency signal to an interlace scanning video signal having luminance and chrominance components, transmitting said interlace scanning video signal, receiving the transmitted video signal, extracting a signal of predetermined frequency band from the received video signal by a high-pass filter, motion detecting the received video signal as a function of an amplitude of the extracted signal of predetermined frequency band, selecting one of comb filtering the received video signal and band pass filtering the received video signal as a function of the detection of motion, and separating the received video signal into respective luminance and chrominance components using said band pass filtering when motion is detected.

4. The method of claim 3, further comprising the steps of:

decoding said chrominance components into color difference signals, converting said luminance components and said color difference signals into primary color signals.

5. A video signal transmission/reception system comprising:

means for picking up an image by sequential scanning and for producing a derived image signal, low-pass filter means for limiting said derived image signal to a vertical frequency band defined by a predetermined transmission format, means for scan converting the limited vertical frequency band signal to an interlace scanning video signal having luminance and chrominance components, means for transmitting said interlace scanning video signal, means for receiving the transmitted video signal, high-pass filter means for extracting a signal of a predetermined frequency band from the received video signal, means for motion detecting the received video signal as a function of an amplitude of the extracted signal of predetermined frequency band; and means for selecting one of a comb filter and a band pass filter, for filtering the received video signal, as a function of the detection of motion by said motion detection means, said comb filter being selected for separating the received video signal into respective luminance and chrominance components when no motion is detected by said motion detection means.

6. The system of claim 5, further comprising:

means for decoding said chrominance components into color difference signals, and means for converting said luminance components and said color difference signals into primary color components.

7. A video signal transmission/reception system comprising:

means for picking up an image by sequential scanning and for producing a derived image signal, low-pass filter means for limiting said derived image signal to a vertical frequency band defined by a predetermined transmission format, means for scan converting the limited vertical frequency band signal to an interlace scanning video signal having luminance and chrominance components, means for transmitting said interlace scanning video signal, means for receiving the transmitted video signal, high-pass filter means for extracting a signal of a predetermined frequency band from the received video signal, means for motion detecting the received video signal as a function of an amplitude of the extracted signal of predetermined frequency band; and means for selecting one of a comb filter and a band pass filter, for filtering the received video signal, as a function of the detection of motion by said motion detection means, said band pass filter being selected for separating the received video signal into respective luminance and chrominance components when motion is detected by said motion detection means.

8. The system of claim 7, further comprising:

means for decoding said chrominance components into color difference signals, and means for converting said luminance components and said color difference signals into primary color signals.

* * * * *